April 14, 1931.  E. FARRELL  1,800,613
ATTACHMENT FOR FURNITURE
Filed May 16, 1930
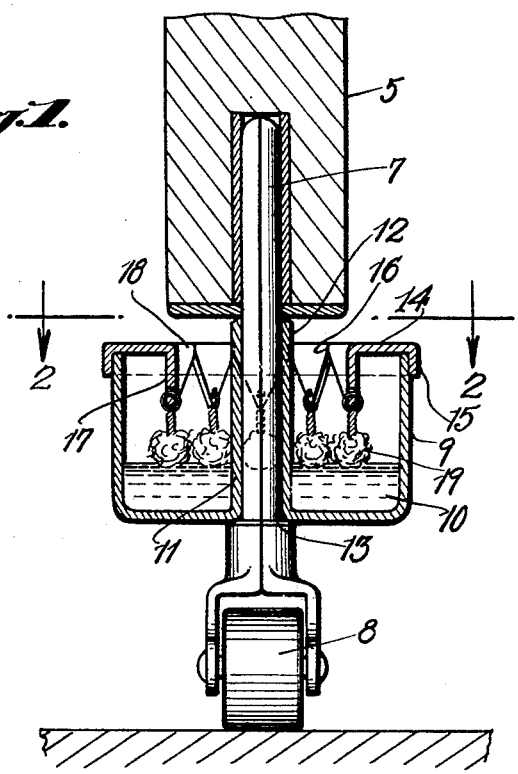
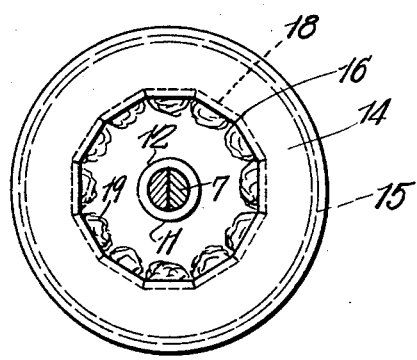
Inventor
*Edward Farrell*
By *Clarence A. O'Brien*
Attorney Patented Apr. 14, 1931

1,800,613

UNITED STATES PATENT OFFICE

EDWARD FARRELL, OF NEW YORK, N. Y.

ATTACHMENT FOR FURNITURE

Application filed May 16, 1930. Serial No. 453,032.

The present invention relates to improvements in attachments for furniture, and more particularly it pertains to devices especially adapted for attachment to articles of furniture to prevent insects from crawling up the legs thereof, and commonly known as insect guards.

The invention has for a main object, the provision of a device of the above character which is especially adapted for use in connection with articles of furniture mounted upon casters, and the device includes a novel insecticide carrying well or cup adapted to be interposed between a caster and the end of the leg of an article of furniture, the insecticide acting as a barrier which prevents insects from crawling from the caster to the leg of the article of furniture.

A further object of the invention resides in the provision of a lure to attract the insects into the insecticide well or cup and thereby result in their destruction.

A further object of the invention resides in the provision of a device of the above mentioned character which may be readily disassembled for the purposes of cleaning and refilling the same with an insecticide.

With the above and other objects in view, reference is had to the accompanying drawing, in which;

Figure 1 is a detail sectional view of a device constructed in accordance with the present invention, and Figure 2 is a horizontal sectional view taken on the line 2—2 of Figure 1.

In the drawing, the reference character 5 designates the leg of an article of furniture, provided with the ordinary caster shank receiving socket. 7 designates the caster shank upon the lower end of which is mounted in any desired manner, a caster such as 8.

In accordance with the present invention, a receptacle 9 which forms a well or cup for a suitable insecticide 10 is interposed between the caster 8, and the free or lower end of the leg 5 of the article of furniture. The receptacle 9 is preferably formed of one piece of material, and has a centrally disposed tubular extension 11 for the reception of the caster shank 7, and which projects to a point above the open or upper edge of the receptacle 9 as indicated at 12. The receptacle may rest upon a shoulder 13 formed on the caster shank 7, and the weight of the article of furniture is carried upon the upper end of the tubular extension 11, the lower end of the leg 5 of the article of furniture resting directly thereon.

A cover 14 is provided for the receptacle 9, and said cover has an outer flange 15 and a substantially centrally arranged opening 16. Extending downwardly from the edge of the opening 15 of the cover 14 there are a plurality of depending members 17, which may be formed by radially splitting the cover, and bending the portions intermediate said split as indicated at 18. Suspending from each of the depending members 17, there is an insect lure 19 preferably in the form of small bunches of fibrous material such as absorbent cotton or the like.

The insect lures 19 are preferably partially saturated with the insecticide 10, the level of said insecticide in the receptacle being such that the lower portions at least of the insect lures 19 will touch the surface of the insecticide and thereby become partially saturated.

From the foregoing it will be obvious that insects crawling up the caster and around the outside of the receptacle 9, and over the cover thereof will be confronted by the central opening 16 of the cover the defining edge of which is so spaced from tubular extension 11 of the receptacle as to prevent the insect reaching said tubular extension. Upon seeing the lures 19, the insects crawl downwardly of the depending members 17 and into the lures 19 which latter being saturated with the insecticide, insures destruction of the insects.

While in the present illustration, the invention has been set forth in a preferred form, it is to be understood that the invention is not to be limited to the form in which it is herein shown, but may be executed in other forms which rightfully fall within the scope of the appended claims.

Having thus described the invention, what

I claim as new and desire to secure by Letters-Patent, is:

1. A device of the character described comprising an insecticide well or cup, a cover therefore, and a plurality of insect lures depending from said cover into the insecticide well or cup.

2. A device of the character described comprising an insecticide well or cup, a cover therefore, and a plurality of insect lures depending from said cover, and in spaced relation to the side walls of the insecticide well or cup.

3. A device of the class described comprising an insecticide well or cup, a cover therefore, said cover having a central opening, a plurality of depending members defining the edge of the central opening of the cover, and a plurality of insect lures suspended from said depending members.

4. A device of the class described comprising an insecticide well or cup, a cover therefore, said cover having a central opening, a plurality of depending members defining the edge of the central opening of the cover, and a plurality of insect lures suspended from said depending members, said insect lures each comprising a bunch of fibrous material.

In testimony whereof I affix my signature.

EDWARD FARRELL.